3,524,826
COVULCANIZABLE BROMINATED
TERPOLYMERS
Edward N. Kresge, Elizabeth, Charles P. O'Farrell, Roselle, and Delmer L. Cottle, Highland Park, N.J., assignors to Esso Research and Engineering Company, a corporation of Delaware
No Drawing. Continuation-in-part of application Ser. No. 514,683, Dec. 17, 1965. This application Feb. 24, 1969, Ser. No. 801,868.
Int. Cl. C08f 27/03; C08d 9/08; C08c 9/14
U.S. Cl. 260—5                                            11 Claims

ABSTRACT OF THE DISCLOSURE

Elastomeric terpolymers of ethylene-propylene and a nonconjugated acyclic or alicyclic diene are additively brominated at non-backbone sites of unsaturation at temperatures below 60° C. in the absence of free-radical initiators. Such brominated polymers are readily compatible with highly unsaturated synthetic and natural rubbers and yield covulcanizates having outstanding physical properties.

CROSS-REFERENCE TO RELATED APPLICATION

This application is a continuation-in-part of Ser. No. 514,683, filed Dec. 17, 1965, now abandoned.

BACKGROUND OF THE INVENTION

Field of the invention

The present invention relates to brominated terpolymers and deals particularly with a procedure for their preparation and their subsequent use in combination with highly unsaturated elastomeric compositions. More particularly, the present invention is directed to brominated ethylene-propylene-nonconjugated diene terpolymers having essentially no unsaturation in the backbone and to cured and uncured elastomeric compositions containing said brominated terpolymers.

Description of the prior art

Ethylene-propylene-nonconjugated diolefin terpolymers are well known articles of commerce. Such terpolymers, the preparation of which is described in U.S. Pat. 2,933,480; 3,000,866; and 3,093,621 contain sites of unsaturation in groups pendant to or are in cyclic structures outside the main polymer chain or backbone and are characterized by the absence of chain or backbone unsaturation which absence renders these materials extremely resistant to ozone. While rubber compounders have sought to use low unsaturated terpolymers in compositions with highly unsaturated elastomeric materials such as natural rubber, styrene-butadiene rubber, acrylonitrile-butadiene rubber, etc., to impart the terpolymer's ozone resistance to the highly unsaturated rubbers, these efforts have not been fruitful since the terpolymers are incompatible with highly unsaturated materials.

Numerous techniques have been devised, including halogenation of terpolymers having limited unsaturation, to render the terpolymers compatible with highly unsaturated synthetic and natural rubbers. For example, Belgian Pat. No. 648,665, teaches the high temperature bromination of partially unsaturated terpolymers to secure products that are compatible with highly unsaturated rubbers. However, the techniques specified for use in the Belgian patent do not lead to totally acceptable brominated products. For example, the Belgian patentee required that the direct bromination, accomplished with molecular bromine be conducted at temperatures of at least 85° C. when U.V. light was used as an initiator, or at least 100° C. in the absence of an ultraviolet initiator. When the direct bromination is conducted at such elevated temperatures, the bromine is substituted into the terpolymer such that either allylic or vinylic bromides are formed upon the reaction of the molecular bromine with the remaining double bond of the nonconjugated diene termonomer which may be pendant to, contained in, or attached to a cyclic structure outside of the main terpolymer chain. Additionally, minor amounts of bromine are introduced into the main polymer chain at sites having tertiary carbon atoms leading to undesirable unsaturation due to subsequent dehydrohalogenation.

The terpolymers which contain either allylic or vinylic substituted bromine are more susceptible to degradation during operations wherein the terpolymer is cocured at elevated temperatures with a highly unsaturated rubber than the corresponding dihalide *addition* product which is formed by partially or completely saturating the unreacted double bond contained in a group outside the main terpolymer chain. Additionally, when allylic and vinylic bromide products are formed by substitutive bromination, there is loss of one-half the bromine by evolution of hydrogen bromide. When dibroide addition products are formed, essentially no hydrogen bromide is evolved and hence the process for the formation of the dihalide product is more economical in the utilization of bromine.

SUMMARY OF THE INVENTION

Now, in accordance with the present invention, it has been discovered that brominated ethylene-propylene-nonconjugated diene terpolymers that are readily compatible with highly unsaturated synthetic and natural rubbers and which are very resistant to degradation during curing operations with a highly unsaturated rubber and containing little or no bromine substitution in the main polymer chain can be produced by brominating the terpolymer with molecular bromine under mild temperature conditions and in the absence of free-radical generators such as to optimize the formation of dibromine addition on the olefin site outside the main terpolymer chain. Preferably, the brominated terpolymer of this invention, which is a highly attractive rubber blending component, contains at least 1 wt. percent bromine. At least 60, preferably 70 to 100%, of the unsaturation in the unbrominated terpolymer is contained in groups extraneous to the main terpolymer chain and the brominated terpolymer consists of dibromide addition products as opposed to substitutive products containing vinylic or allylic bromide substitution.

The terpolymers useful in the formation of the products of the present invention includes terpolymers of ethylene, one or more higher alpha monoolefins having from 3 to 8 carbon atoms, preferably propylene, and a straight or branched chain acyclic, or an alicyclic nonconjugated diolefin. Useful polymers have relatively low levels of unsaturation, preferably less than 10 mol percent unsaturation. As used herein, the term mol percent unsaturation is defined as being the number of moles of diolefin per 100 moles of monoolefins and diolefin incorporated in the polymer. Preferably, the elastomeric terpolymers which are particularly suitable contain in general at least about 30 mol percent, preferably not more than 85 mol percent, of ethylene, between about 15 and 70 mol percent of higher alpha monoolefin and between 1.0 to 10 mol percent of nonconjugated diolefin.

Representative nonlimiting examples of nonconjugated diolefins that may be used as the third monomer in the terpolymer include:

(A) Straight chain acyclic dienes such as: 1,4-hexadiene; 1,5-hexadien; 1,6-octadiene.

(B) Branched chain acyclic dienes such as: 5-methyl 1,4-hexadiene; 3,7-dimethyl 1,6-octadiene; 3,7-dimethyl 1,7-octadiene; and the mixed isomers of dihydro-myrcene and dihydro-ocimene.

(C) Single ring alicyclic dienes such as: 1,4-cyclohexadiene; 1,5-cyclo-octadiene; 1,5-cyclododecadiene; 4-vinyl-cyclohexene; 1-allyl 4-isopropylidene cyclohexane; 3-allyl cyclopentene; 4-allyl cyclohexene and 1-isopropenyl 4-(4-butenyl) cyclohexane.

(D) Multi-ring alicyclic fused and bridged ring dienes such as: tetrahydroindene; methyltetrahydroindene; dicyclopentadiene; bicyclo (2,2,1) hepta 2,5-diene; alkenyl, alkylidene, cyclo-alkenyl and cyclo-alkylidene norbornenes such as 5-methylene norbornene, 5-ethylidene norbornene, 5-propenyl norbornene, 5-isopropylidene norbornene, 5-(4-cyclopentenyl) norbornene; 5-cyclohexylidene norbornene.

In general, useful nonconjugated diolefins contain from 5 to 14 carbon atoms and terpolymers containing the same exhibit viscosity average molecular weights ranging from about 70,000 to 350,000, preferably from about 100,000 to 250,000, as determined in Decalin at 135° C.

Structurally the terpolymers of the instant invention may be illustrated for various third nonconjugated diene monomers as random polymers having the following moieties:

(1)
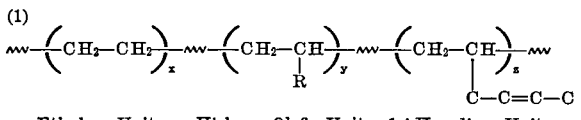
Ethylene Units    Higher α-Olefin Units    1,4 Hexadiene Units (2)
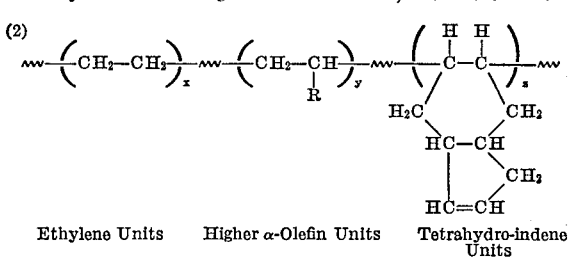
Ethylene Units    Higher α-Olefin Units    Tetrahydro-indene Units (3)
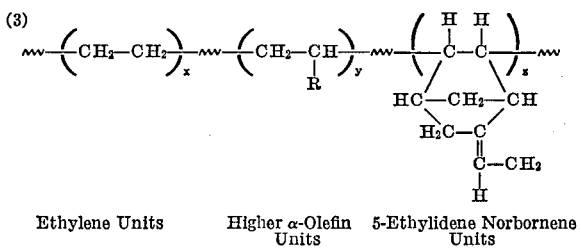
Ethylene Units    Higher α-Olefin Units    5-Ethylidene Norbornene Units From the above it will be seen that the main polymer chain or backbone of the terpolymer is essentially saturated and that any unsaturation present in the molecule is either pendant to, part of, or attached to a cyclic structure and the unsaturation is extraneous to the main chain. From the above it will be seen that when bromination occurs *additively*, 2 atoms of bromine add to the double bond with the formation of a dibromide. By contrast when bromination occurs *substitutively*, a hydrogen is abstracted to be replaced by a bromine and one-half the bromine is lost as hydrogen bromide.

The above-described terpolymers are prepared employing techniques well known to those skilled in the art. For example, terpolymers of ethylene, propylene and 5-ethylidene-2-norbornene are prepared in hydrocarbon diluents under the influence of Ziegler catalysts which may consist of transition metal halides such as titanium tetrachloride and organo-aluminum compounds such as diethyl aluminum chloride. Generally, Ziegler catalysis must be conducted in the complete absence of water and oxygen. The preferred reaction diluents are saturated aliphatic or aromatic hydrocarbons as well as nonreactive halogen compounds such as tetrachloroethylene. High yields of elastomeric products are secured when the reaction is conducted at mild conditions of temperature and pressure.

According to the present invention, the hereinbefore described terpolymers are brominated with an amount of molecular bromine sufficient to yield a terpolymer containing from 1 to 10 wt. percent bromine, preferably 2 to 4 wt. percent bromine. Preferably, the bromination reaction is accomplished using solution techniques.

With the preferred technique, a 3 to 15 wt. percent solution containing 100 parts of the terpolymer in a suitable liquid solvent, which may be a saturated aliphatic hydrocarbon such as hexane or heptane; an aromatic hydrocarbon such as benzene, toluene or mixed xylenes; a cycloaliphatic hydrocarbon such as methyl cyclopentane, cyclohexane or methyl cyclohexane; or halogenated derivatives of the above hydrocarbons such as chloroform, carbon tetrachloride, tri- and tetra-chloroethane, ortho dichlorobenzene and the like, is reacted with 3 to 10 parts of elemental bromine, preferably dissolved in a suitable solvent such as $CHCl_3$, $CCl_4$, hexane and heptane.

Alternatively, the desired bromination can be achieved by contacting the terpolymer solution with the above-stated amounts of bromine which is admixed in a carrier gas such as nitrogen. In this instance, bromination is achieved by passing the bromine contained in the carrier gas into the polymer solution with intimate agitation. The time during which the bromine is in contact with the terpolymer maintained in the hydrocarbon solution varies with the degree of bromination desired. The use of elevated pressures during the bromination reaction is optional.

The temperature at which the bromination reaction is carried out is a critical feature of the instant invention. The bromination reaction can be conducted at temperature ranging from −30° C. to about 60° C., preferably from 0° C. to 35° C. and in no event should exceed about 80° C. during the reaction period. If temperatures in excess of about 80° C. are utilized, the substitution reaction at the site of olefinic unsaturation will be the predominant reaction and vinylic bromide or allylic bromide substitution products will be formed. Additional unsaturation will be introduced into the polymer by means of backbone bromination followed by dehydrobromination. Substitutive reactions should be avoided as corrosive hydrogen bromide is evolved and, more importantly, the products formed tend to degrade under the influence of elevated temperatures normally associated with curing reactions and are more susceptible to ozone degradation.

When the bromination reaction is conducted at temperatures within the above-specified ranges, from 50 to 90%, more generally from 70 to 100% of the bromine added to the terpolymer is incorporated as a dibromide addition product at the olefin sites contained in groups extraneous to the main terpolymer chain; that is, the olefinic site of unsaturation of the diolefin compound not saturated by virtue of its copolymerization with either an ethylene or propylene molecule is completely saturated with two atoms of bromine. As a result, the brominated terpolymer products of this invention always have less unsaturation than the starting terpolymer and may be made to contain little or no residual unsaturation. When bromine substitution at the site of unsaturation or in the backbone occurs, the degree of unsaturation in the total terpolymer remains the same or is slightly increased after bromination by a process of dehydrobromination. Due to the fact that the sites of extraneous unsaturation are saturated with bromine as opposed to direct substitution to a saturated carbon atom, no corrosive hydrogen bromide is evolved during the reaction. Additionally, if the bromination reaction is conducted at temperatures in excess of about 80° C., a certain amount of the bromine reagent used replaces hydrogen atoms in the main polymer chain and the polymer thus formed is less resistant to ozone degradation because of main-chain unsaturation introduced by dehydrobromination than the brominated products formed at low temperatures.

The bromine containing terpolymers prepared with the low temperature techniques heretofore specified can be mixed in all ratios with unsaturated rubber-like elastomers, having iodine numbers in excess of 50 (cg. I/gram of elastomer), including natural rubber and diene rubbers such as styrene-butadiene rubber, acrylonitrile-butadiene rubber, cis-polybutadiene and cis-polyisoprene, etc., and thereafter can be satisfactorily cocured using standard vulcanization techniques. In a typical vulcanization procedure, the brominated terpolymers of this invention either alone or blended with major or minor amounts of highly unsaturated synthetic or natural rubber are admixed in either a rubber mill or a Banbury mixer with sulfur, accelerators, fillers, fibers, plasticizers, softeners, and similar materials. The vulcanization or cruing of the brominated terpolymers either alone or in admixture with highly unsaturated rubbery compositions may be conducted at temperatures varying from 100° C. to 200° C., preferably 150° C. to 160° C., for time periods varying from 0.15 to 1.5 hours.

A typical vulcanization recipe includes: 50 parts of brominated ethylene-propylene-5-ethylidene-2-norbornene terpolymer and 50 parts of styrene-butadiene rubber, 25 to 200 parts of a filler such as petroleum coke, carbon black or various types of clay, 3 to 10 parts zinc oxide, 0.5 to 1.5 parts stearic acid, 1.0 to 2.0 parts sulfur, 1.0 to 2.0 parts benzothiazyl disulfide and 0.2 to 1.0 part of tetramethylthiuram disulfide. The addition of other reinforcing agents, lubricants, plasticizers, vulcanization accelerators, and oxidation retarders, is well within the skill of the rubber chemist. Vulcanization procedures in general are described in the Encyclopedia of Chemical Technology, Kirk and Othmer, Interscience Encyclopedia, Inc., 1953, Part II, pages 892–927.

The brominated terpolymers of the present invention have many varied uses. For example, their most outstanding use occurs in the formation of automotive products such as motor mounts, window gaskets and tires. Because the brominated polymers of this invention are compatible in all proportions with natural rubber and diene rubbers and are extremely resistant to ozone degradation, the polymers of this invention admixed and cocured with either natural rubber or diene rubbers having iodine numbers in excess of 50 (cg. I/gram of elastomer) are especially suited for use in tires.

DESCRIPTION OF THE PREFERRED EMBODIMENTS

The preparation, properties, compounding, vulcanization and use of the brominated terpolymers of this invention are move fully set forth in the following examples. All parts mentioned in the examples are parts by weight unless otherwise indicated.

EXAMPLE 1

One hundred grams of an ethylene-propylene-5-methylene-2-norbornene terpolymer containing 55 wt. percent ethylene, 42.5 wt. percent propylene and 2.5 wt. percent 5-methylene-2-norbornene was dissolved in 2 liters of n-heptane to form a polymer cement. To this cement was then added 3.8 g. of bromine at room temperature. Samples were removed from the reaction at one minute intervals, quickly washed with water and the polymer recovered by adding an excess of acetone to the cement. The polymers were then vacuum dried and the amount of methylene unsaturation due to the presence of the 5-methylene-2-norbornene in the polymer was determined by measurement of the infrared absorption at 11.5 microns. It was found that all of the unsaturation was reacted within 10 minutes. After 30 minutes the entire reaction mass was washed with water and one-half of the polymer recovered by addition of excess acetone to the cement and the other half recovered by steam stripping. The polymers were dried on a hot mill at 300° F. Both polymers contained about 3.5 wt. percent bromine, which is equivalent to about two atoms of bromine per double bond originally in the polymer. Substantially no hydrogen bromide was given off during the reaction. This indicates that the reaction product formed at room temperature contains predominantly dibromide formed by addition to the double bond. One hundred parts of the brominated terpolymer was then compounded with 50 parts of HAF carbon black, 1 part of stearic acid, 5 parts of zinc oxide, 1.5 parts of sulfur, 1.5 parts of tetramethylthiuram disulfide and 0.5 part of benzothiazyl disulfide. After curing the polymer for 45 minutes at 307° F. the resulting vulcanizate was exposed to 0.2 wt. percent ozone at 50% extension and did not break after 32 hours exposure. This indicates that the polymer contains no unsaturation in the polymer chain. Polymers containing unsaturation in the main chain are more readily subject to degradation when exposed to ozone under these conditions.

EXAMPLE 2

One hundred grams of ethylene-propylene copolymer containing 45 wt. percent ethylene and 55 wt. percent propylene was dissolved in 2 liters of n-heptane and heated to 80° C. To the cement was added 3.5 ml. of bromine in 25 ml. of n-heptane. The reaction was allowed to proceed for one hour and the resulting product was cooled to room temperature, washed with water and steam stripped. The dried polymer was found to contain 2.64% bromine. Fifty parts of the brominated copolymer was compounded with 50 parts per hundred parts of polymer (phr.) of HAF carbon black, 5.0 phr. of zinc oxide, 1.0 phr. of stearic acid, 0.5 phr. of sulfur and 4.0 phr. of dicumyl peroxide-40% HAF. After curing the polymer for 45 minutes at 307° F. the resulting vulcanizate was exposed to 0.2 vol. percent ozone at 50% extension and exhibited cracks after 7 hours of exposure. Non-brominated ethylene-propylene copolymer formulated and cured in the same manner will not crack in 14 days under the same ozone exposure.

This experiment shows that at *elevated temperatures* bromination of ethylene-propylene copolymer does occur and indicates that the same reaction (i.e. bromination of the main chain) will take place in ethylene-propylene-5-methylene-2-norbornene terpolymer at elevated temperatures. Furthermore, bromination of the main chain of ethylene-propylene copolymers and therefore ethylene-propylene terpolymers results in a large decrease in ozone resistance.

EXAMPLE 3

One hundred grams of ethylene-propylene copolymer containing 45 wt. percent ethylene and 55 wt. percent propylene was dissolved in 2 liters of n-hexane and cooled to 10° C. To the cement was added 2.0 ml. of bromine in 25 ml. of n-hexane. The reaction was allowed to proceed for one hour at room temperature. The resulting product was washed with water and steam stripped. The dried polymer was found to contain less than 0.5% bromine. This result shows that little substitutive bromination took place under these conditions of temperature and concentration.

EXAMPLE 4

In order to determine the nature of the reactive species in brominated ethylene - propylene-5-methylene-2-norbornene terpolymer, a model compound, 2-methylene norbornane, was reacted with molecular bromine. Twenty-seven grams of 2-methylene norbornane was dissolved in 200 ml. of n-pentane. To the solution was added 45.0 grams of bromine in 55 ml. of n-pentane. The temperature of the reaction was maintained at 5° C. for one hour. Following bromination the reaction mass was permitted to warm to room temperature. The solution was washed with 1 liter of water, dried over magnesium sulfate and the solvent removed. The crude product weighed 59 grams (90% yield) and was analyzed for bromine content (Dietert method) and was found to contain 58.3% Br. (theory 60.1% for $C_8H_{13}Br_2$). Time of flight mass spectroscopy established the molecular weight of the product at 266 (theory 266). Infrared and nuclear magnetic resonance spectroscopy showed no evidence of unsaturation in the reaction product. These tests show that the reaction product of the bromination of 2-methylene norbornane at room temperature and lower is a dibromide addition product and proves that the reactive species from the bromination of ethylene-propylene-5-methylene-2-norbornene terpolymers using molecular bromine at room temperature, is the dibromide.

EXAMPLE 5

Four hundred grams of an ethylene-propylene-5-methylene-2-norbornene terpolymer containing 55 wt. percent ethylene, 42.2 wt. percent propylene, and 2.8 wt. percent 5-methylene-2-norbornene was first dissolved in 7 liters of n-heptane to form a polymer cement. To this cement was then added dropwise at room temperature 5.6 ml. of bromine (17.5 g.) dissolved in 95 ml. of n-heptane. The resulting solution was stirred for 2 hours at room temperature, washed twice with 2 liters of water, steam stripped and dried on a hot mill at 300° F. The resulting brominated polymer contained 2.89 wt. percent bromine. One hundred parts by weight of the brominated terpolymer was then compounded with 50 parts of HAF carbon black, 1 part of stearic acid, 5 parts of zinc oxide, 1.5 parts of sulfur, 1.5 parts of tetramethylthiuram disulfide, and 0.5 part of benzothiazyl disulfide. A portion of this mixture was then placed in a standard cavity mold and cured at a temperature of 307° F. for 45 minutes. From the resulting cured pad was then cut standard test specimens which were tested for hardness, tensile strength, and elongation. The results of the test indicated that the cured brominated terpolymer exhibited a Shore A hardness (ASTM designation: D676–59T) of 72; a 100% modulus of 410 p.s.i.; a 300% modulus of 1605 p.s.i.; a tensile strength at break of 3320 p.s.i.; and an elongation at break of 575%.

The above tests demonstrate that the brominated terpolymers of the persent invention can be readily cured utilizing standard sulfur recipes to obtain highly attractive vulcanizates.

EXAMPLE 6

Four hundred grams of an ethylene-propylene-1,4-hexadiene terpolymer containing about 72 wt. percent ethylene, 24.8 wt. percent propylene, and 3.2 wt. percent 1,4-hexadiene was dissolved in 8 liters of n-heptane to form a polymer cement. To the polymer cement was added slowly at room temperature 22.75 g. of bromine dissolved in 100 ml. of n-heptane. The resulting bromination reaction was permitted to proceed for 1 hour, after which time the polymer product was washed with water and then steam stripped. The dried polymer contained about 3.49 wt. percent bromine. One hundred parts of the brominated terpolymer was then compounded with 50 parts of SRF carbon black, 5 parts of zinc oxide, 1 part of stearic acid, 1.5 parts of sulfur, 1.5 parts of tetramethylthiuram disulfide, and 0.5 part of benzothiazyl disulfide. A portion of the resulting mixture was then cured in a conventional cavity mold at a temperature of 307° F. for a period of 45 minutes. The resulting cured product exhibited a Shore A hardness of 77; a 100% modulus of 330 p.s.i.; a 300% modulus of 1070 p.s.i.; a tensile strength at break of 2970 p.s.i.; and an elongation at break of 720%.

The data presented in Examples 5 and 6 demonstrate that various types of ethylene-propylene-nonconjugated diolefin terpolymers can be readily brominated and subsequently cured to highly attractive elastomeric vulcanizates.

EXAMPLE 7

To illustrate that normally incompatible ethylene-propylene terpolymers can be cocured with highly unsaturated rubbers after the terpolymer has been first brominated with molecular bromine at low temperatures, a series of tests were conducted wherein a brominated ethylene-propylene-5-methylene-2-norbornene terpolymer containing 4.06 wt. percent bromine was cocured with styrene-butadiene rubber, cis-polyisoprene, poly-3-chlorobutadiene, and butadiene-acrylonitrile rubber. The brominated terpolymer was formed by admixing 400 grams of the terpolymer which exhibited a number average molecular weight of 125,000 and consisted of 55 wt. percent ethylene, 42.3 wt. percent propylene, and 2.8 wt. percent of 5-methylene-2-norbornene in 7.6 liters of n-heptane. To the polymer-heptane cement was added 23.6 grams of bromine (0.148 mole) and the bromination reaction was permitted to proceed at room temperature overnight. The reaction product secured was then washed with water until neutral to litmus and dried to constant weight in a vacuum oven at about 70° C. Samples of the bromine modified terpolymer were then physically blended on a cold mill with equal amounts of either styrene-butadiene rubber containing about 28 wt. percent styrene, polyisoprene having a viscosity average molecular weight of about 150,000, poly-3-chlorobutadiene (chloroprene) having a viscosity average molecular weight of about 185,000, and butadiene-acrylonitrile rubber containing about 70 wt. percent butadiene. One hundred parts of each of the rubber blends were then compounded with 50 parts of HAF carbon black, 1 part of stearic acid, 5 parts of zinc oxide, 0.5 to 1.5 parts of sulfur, 0.5 to 1.5 parts of tetramethylthiuram disulfide and 0.5 part of benzothiazyl disulfide. Portions of the polymer recipe were then press cured into pads utilizing a conventional cavity mold at a temperature of 307° F. for varying periods of time. Following the completion of the curing operation each of the pads obtained were tested for hardness, tensile strength and elongation. The results of the test are set forth in Table I below:

TABLE I

| | Run | | | |
|---|---|---|---|---|
| | 1 | 2 | 3 | 4 |
| | Rubber component in blend | | | |
| | Styrene-butadiene rubber | Polyisoprene | Poly (3-chlorobutadiene) | Butadiene-acrylonitrile rubber |
| Cure time, Min. at 307° F | 60 | 45 | 60 | 45 |
| Physical properties: | | | | |
| Hardness, Shore A | 72 | 79 | 78 | 75 |
| 300% modulus, p.s.i. | 1,360 | | | |
| Tensile, p.s.i. | 2,645 | 2,130 | 3,020 | 2,060 |
| Elongation, percent | 545 | 230 | 285 | 250 |

The physical properties of the covulcanizates indicated above demonstrate that brominated terpolymers containing a substantial degree of dibromide formed by addition to the sites of unsaturation contained in groups extraneous to the terpolymer chain as formed with the present low temperature additive bromination process can be readily cocured with various types of highly unsaturated synthetic rubbers using conventional curatives. The above tests are significant in that they demonstrate that the highly ozone resistant brominated terpolymers can be admixed and cocured with relatively inexpensive and widely available synthetic rubbers resulting in low cost finished materials having a high degree of ozone resistance.

EXAMPLE 8

To illustrate the criticality of the use of brominated ethylene-propylene-nonconjugated diolefin terpolymers that contain a dihalide addition to the olefin site in the terpolymer and which contain essentially no bromination in the main polymer chain, two tests were conducted wherein the same ethylene-propylene-5-methylene-2-norbornene terpolymer which contained about 55 wt. percent ethylene, 42.3 wt. percent propylene, and 2.8 wt. percent of the norbornene were contacted with equal amounts of molecular bromine for the same period of time but at differing temperature conditions and were cured using the same recipe and subjected to an atmosphere containing about 0.2 vol. percent ozone. One hundred parts of each sample of brominated terpolymer was compounded with 50 parts of HAF carbon black, 5 parts zinc oxide, 1 part stearic acid, 1.5 parts sulfur, 1.5 parts of tetramethylthiuram disulfide and 0.5 part of benzothiazyl disulfide. Each of the recipes was press cured into pads in a standard cavity mold at a temperature of 307° F. for 30 minutes. Following vulcanization, each of the samples was tested for hardness, tensile strength and elongation as well as ozone resistance. The results of the tests are set forth in Table II below:

TABLE II

| Run | 5 | 6 |
|---|---|---|
| Bromination temperature (° C.) | 25 | 80 |
| Mooney Vis., ML 8 min. at 260° F | 92 | >150 |
| Percent bromine | 2.66 | 2.70 |
| Physical properties: | | |
| Press cure 30 min. at 307° F.: | | |
| Hardness Shore A | 73 | 76 |
| 100% modulus, p.s.i | 425 | 425 |
| 300% modulus, p.s.i | 2,230 | 2,150 |
| Tensile strength, p.s.i | 3,600 | 3,700 |
| Elongation, percent | 425 | 455 |
| Ozone resistance: | | |
| Time to crack, hrs | 26 | 12 |
| Time to break, hrs | 32 | 16 |

As shown in the above table, bromination at 80° C. serves to produce a polymer with physical properties similar to the terpolymer brominated at 25° C. However, the Mooney viscosity of the hot milled 80° C. brominated terpolymer was greater than 150 and exhibits 70% gel in n-heptane at temperatures of about 25° C. This indicates that the elevated temperature bromination promotes crosslinking of the raw polymer. Exposure of the terpolymers to an atmosphere containing about 0.2 vol. percent ozone further showed that the product of Run 6 was at least twice as susceptible to deterioration under ozone attack than the product brominated at 25° C. This result suggests that the bromination in high temperature reactions is taking place on the polymer backbone with subsequent introduction of unsaturation along the main chain, causing the total polymer to be more susceptible to ozone.

EXAMPLE 9

To further illustrate the criticality of bromination temperature, 600 g. of uninhibited ethylene-propylene-methylene norbornene terpolymer containing 52 wt. percent ethylene and 2.8 wt. percent methylene norbornene was dissolved in 11.4 liters of heptane and the cement was divided into three equal portions. Each portion was subjected to a different temperature, i.e. 0°, 60°, 100° ±4° C. and to each portion of cement was added 3 ml. of bromine in 50 ml. of heptane. The bromination was allowed to proceed for 3 hours in the reactions run at 0° and 60°; at 100° the reaction mixture turned black after 5 minutes and the reaction was stopped after ½ hour. The polymer solutions were washed with two one liter portions of 20% aqueous methanol followed by one liter of water. 2.0 g. of calcium stearate was added and the cements were steam stripped. The polymers were analyzed for bromine content and compounded as in Example 8. Each of the compounds was press cured in a standard cavity mold at a temperature of 307° F. for 30 minutes. The physical properties and ozone resistance of the vulcanizates were determined and are shown in Table III.

TABLE III

| Temp. of bromination, ° C. (±4) | 0 | 60 | 100 |
|---|---|---|---|
| Mooney viscosity at 260° ML, 8 min | 64 | 67 | 78 |
| Wt. percent bromine | 2.92 | 2.54 | 2.43 |
| Physical properties: | | | |
| Press cured 30 min. at 307° F.: | | | |
| Hardness, Shore A | 70 | 70 | 70 |
| 100% modulus, p.s.i | 340 | 340 | 340 |
| 300% modulus, p.s.i | 1,480 | 1,380 | 1,580 |
| Tensile strength, p.s.i | 3,150 | 3,020 | 3,560 |
| Elongation, percent | 545 | 550 | 580 |
| Ozone Resistance (ozone concn. 0.2 vol. percent): | | | |
| Time to crack, hrs | 96 | 120 | 38 |
| Time to break, hrs | 168 | 168 | 50 |

Table III shows again that bromination in excess of 80° C. or at 100° C., while producing a polymer with comparable physical properties as one brominated below 80° C., has much inferior ozone resistance with respect to time for cracking or breaking.

EXAMPLE 10

320 grams of an ethylene-propylene-ethylidene norbornene terpolymer containing 58 wt. percent of ethylene and 3.2 wt. percent of ethylidene norbornene, the latter concentration determined by iodine number, was dissolved in 8 liters of n-heptane and while stirring, 15.4 grams of bromine dissolved in 200 ml. of carbon tetrachloride were added over the course of ½ hour while maintaining the temperature at 30±1° C. Stirring was continued for an additional ½ hour and then the entire reaction mixture was sparged with dry nitrogen to remove traces of unreacted bromine. The brominated terpolymer was then washed with two 2 liter portions of water and after adding 3.2 grams of calcium stearate and 0.32 gram of 2,6-di-tertiary-butyl-para-cresol, n-heptane was removed by stripping with steam. The product was then dried at 300° F. and showed on analysis a bromine content of 3.14 wt. percent and an iodine number of 0.0. The lack of unsaturation as determined by the iodine number indicated that all unsaturation originally present in the terpolymer had been removed by saturation with bromine added to the double bond.

EXAMPLE 11

The brominated terpolymer of Example 10 was compounded in a gum cure wtih the following recipe and mill mixed for 40 minutes at 307° F.:

| | Parts by wt. |
|---|---|
| Brominated Terpolymer of Example 10 | 100 |
| Zinc oxide | 5.0 |
| Stearic acid | 2.0 |
| TUADS [1] | 0.2 |
| Sulfur | 1.2 |
| ALTAX [2] | 1.5 |

[1] TUADS = Tetramethylthiuram disulfide.
[2] ALTAX = Benzothiazyl disulfide.

The above mill mixed compound was analyzed for gel and swell by immersion in cyclohexane at 25°±1° C. for a period of 72 hours. A gel content of 95.7% and a volume swell of 396 vol. percent was obtained showing that an excellent cure of the above compound had been obtained. The ozone resistance of the compound was determined by subjecting a sample to 0.2 wt. percent of ozone in air under 20% extension and 100° F. No cracks in the sample were noted after exposure for 168 hours.

EXAMPLE 12

A gum cure consisting of a mixture of 30 parts by weight of the brominated terpolymer of Example 10 with 70 parts by weight of natural rubber compounded in the same manner as Example 11 and cured in the same manner showed a gel content in cyclohexane of 95.0% and a volume swell of 416%. A sample of the covulcanized product was exposed to 0.2 wt. percent of ozone under the same conditions of temperature and extension as in Example 11 and showed no cracks after 172 hours.

While there are above-described a number of specific embodiments of the present invention, it is obviously possible to produce other embodiments of various equivalent modifications and variations thereof without departing from the spirit and scope of the invention.

Having set forth the general nature and specific embodiments of the present invention, the true scope is now particularly pointed out in the appended claims.

What is claimed is:

1. An additively brominated terpolymer of: ethylene, a $C_3$ to $C_8$ alpha olefin, and a $C_5$ to $C_{14}$ nonconjugated diolefin; said terpolymer having prior to bromination, olefinic unsaturation extraneous to a saturated main backbone chain, and said brominated terpolymer having substantially all the bromine attached to carbon atoms extraneous to the backbone, said additively brominated terpolymer containing 1% to 10% by weight of bromine and being prepared by the addition of elemental bromine to a solution of the unbrominated terpolymer at a temperature of about 0 to 35° C.

2. The composition of claim 1 wherein said brominated terpolymer contains a combined bromine content of 2 to 4 wt. percent.

3. The composition of claim 1 wherein the nonconjugated diene is a $C_5$ to $C_{14}$ acyclic diolefin.

4. The composition of claim 1 wherein the nonconjugated diene is a $C_6$ to $C_{14}$ alicyclic nonconjugated diolefin.

5. The composition of claim 3 wherein the acyclic diolefin is selected from the group consisting of 1,4-hexadiene, 1,5-hexadiene, 3,7-dimethyl 1,6-octadiene, 3,7-dimethyl 1,7-octadiene, dihydromyrcene and dihydroocimene.

6. The composition of claim 4 wherein the alicyclic diolefin is selected from the group consisting of 1,4-cyclohexadiene, bicyclo (2,2,1) hepta 2,5-diene, 1,5-cyclooctadiene, 5-methyl bicyclo (2,2,1) hepta 2,5-diene, 5-methylene norbornene, 5-ethylidene norbornene, 5-isopropylidene norbornene, 5-propenyl norbornene, dicyclopentadiene, tetrahydroindene, methyl tetrahydroindene and 1,5-cyclododecadiene.

7. The composition of claim 2, admixed with an elastomeric composition having an iodine number in excess of 50 (cg. I/gm. of elastomer).

8. The composition of claim 6, wherein said elastomeric composition is natural rubber.

9. The composition of claim 6, wherein said elastomeric composition is styrene-butadiene rubber.

10. The composition of claim 6, wherein said elastomeric composition is butadiene-acrylonitrile rubber.

11. A process for preparing an additively brominated terpolymer of ethylene, a $C_3$ to $C_8$ alpha olefin, and a $C_5$ to $C_{14}$ nonconjugated diolefin having, prior to bromination, olefinic unsaturation extraneous to a saturated main backbone chain which comprises adding elemental bromine to a solution of unbrominated terpolymer at a temperature of about 0° C. to 35° C. thereby forming a product additively brominated terpolymer containing 1% to 10% by weight of bromine and having substantially all the bromine attached to carbon atoms extraneous to the backbone.

References Cited

UNITED STATES PATENTS

| 2,933,480 | 4/1960 | Gresham et al. | 260—80.5 |
| 2,955,103 | 10/1960 | Baldwin et al. | 260—888 |
| 3,042,662 | 6/1962 | Cottle et al. | 260—85.3 |
| 3,093,621 | 6/1963 | Gladding | 260—80.5 |
| 3,343,582 | 9/1967 | Himes et al. | 260—5 |
| 3,366,508 | 1/1968 | Gallagher | 260—846 |

FOREIGN PATENTS 6,406,221  12/1964  Netherlands.

MURRAY TILLMAN, Primary Examiner

M. J. TULLY, Assistant Examiner

U.S. Cl. X.R.

260—41.5, 96, 80.78, 889